United States Patent
Ma et al.

(10) Patent No.: US 12,408,587 B2
(45) Date of Patent: Sep. 9, 2025

(54) AUTONOMOUS OPERATING APPARATUS

(71) Applicant: SHANGHAI SUNSEEKER ROBOTIC TECHNOLOGY CO., LTD., Shanghai (CN)

(72) Inventors: Miaowu Ma, Shanghai (CN); Jian Xiong, Shanghai (CN)

(73) Assignee: SHANGHAI SUNSEEKER ROBOTIC TECHNOLOGY CO., LTD., Shanghai (CN)

(*) Notice: Subject to any disclaimer, the term of this patent is extended or adjusted under 35 U.S.C. 154(b) by 595 days.

(21) Appl. No.: 17/617,227

(22) PCT Filed: Nov. 22, 2020

(86) PCT No.: PCT/CN2020/130712
§ 371 (c)(1),
(2) Date: Dec. 7, 2021

(87) PCT Pub. No.: WO2021/098869
PCT Pub. Date: May 27, 2021

(65) Prior Publication Data
US 2022/0274655 A1    Sep. 1, 2022

(30) Foreign Application Priority Data

Nov. 22, 2019  (CN) .......................... 201911158505.X
Nov. 29, 2019  (CN) .......................... 201911207649.X
(Continued)

(51) Int. Cl.
*A01D 34/00*    (2006.01)
*A01D 34/81*    (2006.01)
(Continued)

(52) U.S. Cl.
CPC .............. *A01D 34/81* (2013.01); *A47L 9/009* (2013.01); *A01D 34/008* (2013.01);
(Continued)

(58) Field of Classification Search
CPC .... A01D 34/81; A01D 34/008; B60G 99/002; B62D 24/04; B62D 27/04
See application file for complete search history.

(56) References Cited

U.S. PATENT DOCUMENTS 4,736,983 A * 4/1988 Furbee ...................... B62J 1/06
                                                      297/208
10,375,880 B2 * 8/2019 Morin .................. A01D 34/008
(Continued)

FOREIGN PATENT DOCUMENTS

CN    102523841 A    7/2012
CN    104135846 A    11/2014
(Continued)

OTHER PUBLICATIONS

Extended European Search Report dated Nov. 23, 2023, for European Patent Application No. 20889029.
(Continued)

*Primary Examiner* — Alicia Torres
(74) *Attorney, Agent, or Firm* — KARCESKI

(57) ABSTRACT

An autonomous operating apparatus includes a main body mechanism with a first and second main body portions being connected to each other by an attachment unit. The attachment unit includes a first mating member, an elastic member and a second mating member. The first mating member is integrally formed with the first main body portion or is connected to the first main body portion via a first connecting structure. The first end is connected to the first mating member via a second connecting structure, and the second end is connected to the second mating member via a third
(Continued)

connecting structure. The second mating member is integrally formed with the second main body portion or is connected to the second main body portion via a fourth connecting structure. The second end of the elastic member is fixed between the second main body portion and the second mating member.

14 Claims, 5 Drawing Sheets

(30) Foreign Application Priority Data

| Feb. 28, 2020 | (CN) | 202010128008.1 |
| Feb. 28, 2020 | (CN) | 202020225458.8 |
| Feb. 28, 2020 | (CN) | 202020225507.8 |
| Feb. 28, 2020 | (CN) | 202020225510.X |
| Jun. 1, 2020 | (CN) | 202010482772.9 |
| Jun. 1, 2020 | (CN) | 202020965350.2 |
| Jun. 1, 2020 | (CN) | 202020965396.4 |
| Jun. 1, 2020 | (CN) | 202020975038.1 |

(51) Int. Cl.
    *A47L 9/00*      (2006.01)
    *A01D 101/00*      (2006.01)
    *G05D 1/00*      (2006.01)

(52) U.S. Cl.
    CPC ....... *A01D 2101/00* (2013.01); *A47L 2201/00* (2013.01); *G05D 1/021* (2013.01)

(56) References Cited

U.S. PATENT DOCUMENTS

| 10,440,879 | B2 * | 10/2019 | Björn | B60L 50/66 |
| 12,058,957 | B2 * | 8/2024 | Pu | A01D 34/008 |
| 2017/0184171 | A1 | 6/2017 | Chu | |
| 2018/0184586 | A1 | 7/2018 | Song et al. | |

FOREIGN PATENT DOCUMENTS

| CN | 203912605 U | * | 11/2014 | |
| CN | 106612895 A | * | 5/2017 | A01D 34/835 |
| CN | 106717559 A | | 5/2017 | |
| CN | 109631732 A | | 4/2019 | |
| CN | 110053018 A | | 7/2019 | |
| CN | 110053074 A | * | 7/2019 | B25J 19/00 |
| CN | 209268060 U | | 8/2019 | |
| DE | 202013102925 U1 | * | 11/2014 | A01D 34/008 |
| EP | 2425700 A2 | | 3/2012 | |
| EP | 2692220 A1 | * | 2/2014 | A01D 34/008 |
| KR | 20180080146 A | * | 7/2018 | |
| WO | WO-2018174777 A1 | * | 9/2018 | A01D 34/00 |

OTHER PUBLICATIONS

International Search Report dated Feb. 24, 2021, for International Patent Application No. PCT/CN2020/130712.

\* cited by examiner

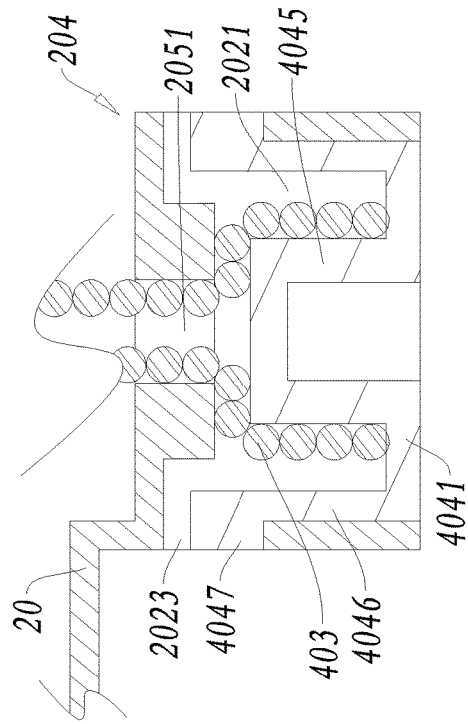
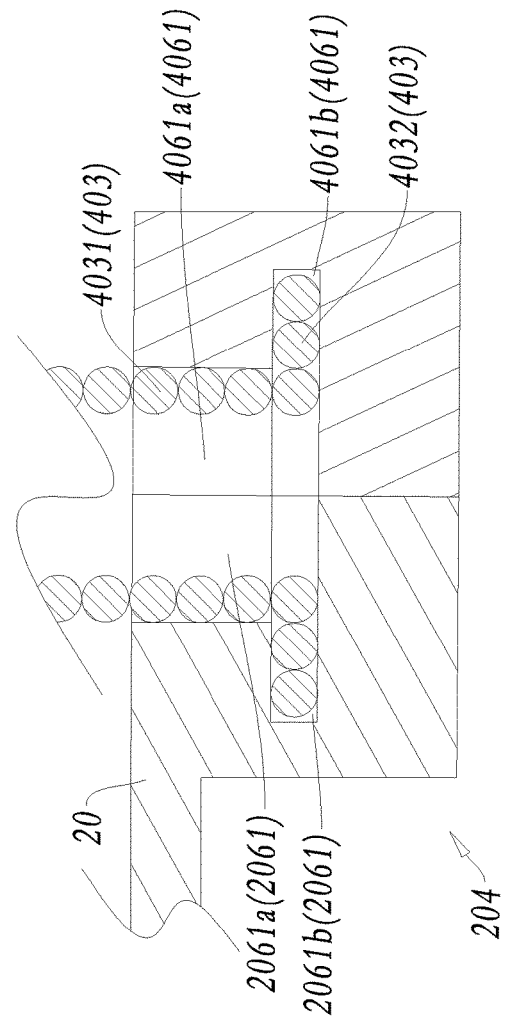
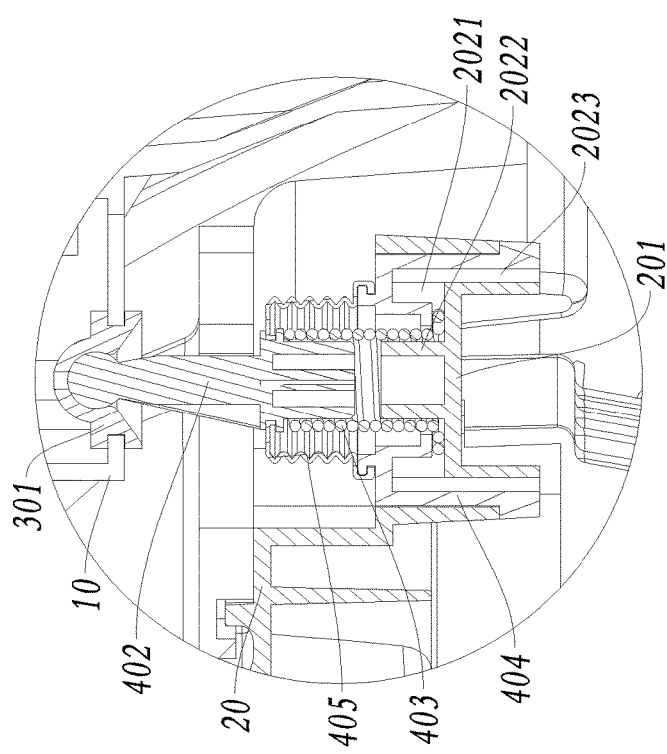

AUTONOMOUS OPERATING APPARATUS

CROSS-REFERENCE TO RELATED APPLICATION(S)

This is a National Stage Entry into the United States Patent and Trademark Office from International Patent Application No. PCT/CN2020/130712, filed on Nov. 22, 2020, which relies on and claims priority to Chinese Patent Application No. 201911158505.X, filed on Nov. 22, 2019; Chinese Patent Application No. 201911207649.X, filed on Nov. 29, 2019; Chinese Patent Application No. 202010128008.1, filed on Feb. 28, 2020; Chinese Patent Application No. 202020225458.8, filed on Feb. 28, 2020; Chinese Patent Application No. 202020225507.8, filed on Feb. 28, 2020; Chinese Patent Application No. 202020225510.X, filed on Feb. 28, 2020; Chinese Patent Application No. 202020965350.2, filed on Jun. 1, 2020; Chinese Patent Application No. 202020965396.4, filed on Jun. 1, 2020; Chinese Patent Application No. 202020975038.1, filed on Jun. 1, 2020; and Chinese Patent Application No. 202010482772.9, filed on Jun. 1, 2020, the entire contents of all of which are incorporated herein by reference.

FIELD OF THE INVENTION

The invention relates to an autonomous operating apparatus, in particular to an autonomous operating apparatus for lawn maintenance.

BACKGROUND OF THE INVENTION

The existing lawn mowers are becoming more and more intelligent, when most intelligent lawn mowers touch obstacles or are lifted up artificially, they will transmit relevant signals to controllers, and the controllers give corresponding feedback, so that the lawn mowers act correspondingly, such as stopping working. The lawn mower is usually provided with a chassis and a housing, and the housing is movably connected to the chassis. When the intelligent lawn mower touches an obstacle or is lifted up artificially, the housing part will move relative to the chassis part, which triggers a corresponding sensor or a micro switch to act, so that the lawn mower performs related actions, such as retreating or stopping working. At present, the housing is movably connected to the chassis via connecting components in general. These connecting components, especially for fixing structures of elastic members, are usually relatively complex and time-consuming to assemble and require the use of tools for installation. In addition, the existing connecting components are usually complex in construction, resulting in higher costs or less reliable operation. Therefore, it is necessary to make further improvements to the existing lawn mowers to solve the above-mentioned problems.

SUMMARY OF THE INVENTION

The technical problem to be solved by the present invention is to provide an autonomous operating apparatus that overcomes the shortcomings of the prior art.

In order to solve the above technical problems, one embodiment of the present invention provides an autonomous operating apparatus comprising a main body mechanism, the main body mechanism comprises a first main body portion and a second main body portion, the first main body portion is configured to be connected to the second main body portion via an attachment unit, wherein the attachment unit is configured to comprise a first mating member, an elastic member and a second mating member; the first mating member is configured to be integrally formed with the first main body portion or can be connected to the first main body portion via a first connecting structure; the elastic member is configured such that the first end of the elastic member can be connected to the first mating member via a second connecting structure, and the second end of the elastic member can be connected to the second mating member via a third connecting structure; the second mating member is configured to be integrally formed with the second main body portion or can be connected to the second main body portion via a fourth connecting structure; the third connecting structure is configured such that only when it is in an assembly state, the second end of the elastic member is fixed between the second main body portion and the second mating member.

As a preferred embodiment of the present invention, wherein the first main body portion is configured as a housing, and the second main body portion is configured as a chassis; or the first main body portion is configured as a chassis, and the second main body portion is configured as a housing; wherein the housing is configured to move relative to the chassis in a restoring manner when receiving an external force.

As a preferred embodiment of the present invention, wherein the elastic member is configured as a spiral spring; and the spiral spring has a constant outer diameter and/or inner diameter, or the spiral spring has a variant outer diameter and/or inner diameter.

As a preferred embodiment of the present invention, wherein the elastic member comprises a first part of the elastic member and a second part of the elastic member, and the outer diameter of the first part of the elastic member is smaller than the outer diameter of the second part of the elastic element; and when the third connecting structure is in a connected state, the second part of the elastic element is fixed between the second main body portion and the second mating member.

As a preferred embodiment of the present invention, wherein the first part of the elastic member is configured as a cylindrical spiral spring; the second part of elastic member is configured as a truncated cone spring, a flat spiral spring, a cylindrical spiral spring or a lug structure.

As a preferred embodiment of the present invention, wherein when the second mating member is connected with the second main body portion, at least a part of the second part of the elastic member is fixed between the second main body portion and the second mating member.

As a preferred embodiment of the present invention, wherein when the second mating member is separated from the second main body portion, the restriction on the axial movement of the elastic member is released; and/or when the second mating member is separated from the second main body portion, the restriction on the radial movement of the elastic member is released.

As a preferred embodiment of the present invention, wherein the second connecting structure is configured such that when the first mating member is connected with the first main body portion, the first end of the elastic member is fixed between the first main body portion and the first mating member.

As a preferred embodiment of the present invention, wherein the elastic member comprises a first part of the elastic member and second parts of the elastic member, and the outer diameter of the first part of the elastic member is smaller than the outer diameter of the second part of the elastic element; the second parts of the elastic member are configured to be arranged at the both ends of the first part of the elastic element; and when the second connecting structure is in the connected state, the two second parts of the elastic member are respectively fixed between the first main body portion and the first mating member, and between the second main body portion and the second mating member.

As a preferred embodiment of the present invention, wherein when the first mating member is separated from the first main body portion, the restriction on the axial movement of the elastic member is released; and/or when the first mating member is separated from the first main body portion, the restriction on the radial movement of the elastic member is released.

As a preferred embodiment of the present invention, wherein the second connecting structure comprises a first spiral groove configured on the first mating member, and a second spiral groove configured at the first end of the elastic member, and the first spiral groove is adapted to the second spiral groove.

As a preferred embodiment of the present invention, wherein the first mating member sequentially comprises a head, a rod portion and a spiral portion from top to bottom, wherein the head is movably connected to the first main body portion, the rod portion is rod-shaped, the spiral portion is provided with a spiral groove, and the first end of the elastic member is matched with the spiral groove, so that the elastic member is connected to the first mating member.

As a preferred embodiment of the present invention, wherein the first connecting structure and/or the fourth connecting structure is configured to be non-detachable.

As a preferred embodiment of the present invention, wherein the first connecting structure and/or the fourth connecting structure is configured to be detachable.

As a preferred embodiment of the present invention, wherein the first connecting structure comprises a connecting sleeve connected to the first main body portion, and a head configured on the first mating member; the connecting sleeve is detachably connected to the first main body portion; and the head is configured to be spherical, and the first mating member is movably connected to the connecting sleeve via the head.

As a preferred embodiment of the present invention, wherein the first connecting structure and/or the fourth connecting structure is configured as a hook and slot structure, a screw fixing structure or a rivet fixing structure.

As a preferred embodiment of the present invention, wherein the first connecting structure comprises a spiral portion configured on one of the first mating member and the first main body portion, and a slot configured on the other of the first mating member and the first main body portion, the spiral portion comprises a hook, and the hook is adapted to the slot.

As a preferred embodiment of the present invention, wherein the fourth connecting structure comprises a spiral portion configured on one of the second mating member and the second main body portion, and a slot configured on the other of the second mating member and the second main body portion, the spiral portion comprises a hook, and the hook is adapted to the slot.

As a preferred embodiment of the present invention, wherein the second mating member is provided with a main body, the main body has a plate-shaped structure, at least a pair of spiral portions extends from the main body, the tail end of the spiral portion is provided with a hook, and the second main body portion is provided with a slot, wherein the hook is configured to snap fit with the slot, a through hole is formed in the middle of the main body, the first end of the elastic member passes through the through hole and is connected to the first mating member, and the second end of the elastic member is connected to the second mating member.

BRIEF DESCRIPTION OF THE DRAWINGS

FIG. 12 is a partial sectional view of the autonomous operating apparatus according to another embodiment of the present invention, with the section lines A-A positioned as in FIG. 4.

FIG. 13 is a partial sectional view of an autonomous operating apparatus according to a further embodiment of the present invention.

FIG. 14 is a partial sectional view of an autonomous operating apparatus according to a further embodiment of the present invention.

DETAILED DESCRIPTION OF EMBODIMENT(S) OF THE INVENTION

The present invention will be described in detail below in connection with the specific embodiments shown in the accompanying drawings. However, these embodiments do not limit the invention, and structural, methodological, or functional changes made by a person of ordinary skill in the art in accordance with these embodiments are included in the scope of protection of the invention.

It is to be understood that in the description of specific embodiments of the invention, the terms "first" and "second" are used for descriptive purposes only and are not to be understood as indicating or implying relative importance or as implicitly specifying the number of technical features indicated. Thus, features qualified with "first" and "second" may explicitly or implicitly include one or more of these features.

In specific embodiments of the invention, unless expressly specified and limited, the terms "connect" and "attach" are to be understood in a broad sense, for example, as fixed or movable connections, as detachable connections, or as integral parts; it may be a direct connection or an indirect connection through an intermediate medium; it may be a connection within two elements or an interaction between two elements. For a person of ordinary skill in the art, the specific meaning of the above terms in the context of the present invention can be understood in the light of the specific circumstances.

In specific embodiments of the invention, unless expressly specified and limited, the first feature "on" or "under" the second feature may include that the first and second features are in direct contact with each other, or the first and second features are not in direct contact with each other, but in contact with each other through another separate feature.

In specific embodiments of the invention, the term "many" means two or more unless expressly specified and limited.

Figure 16:
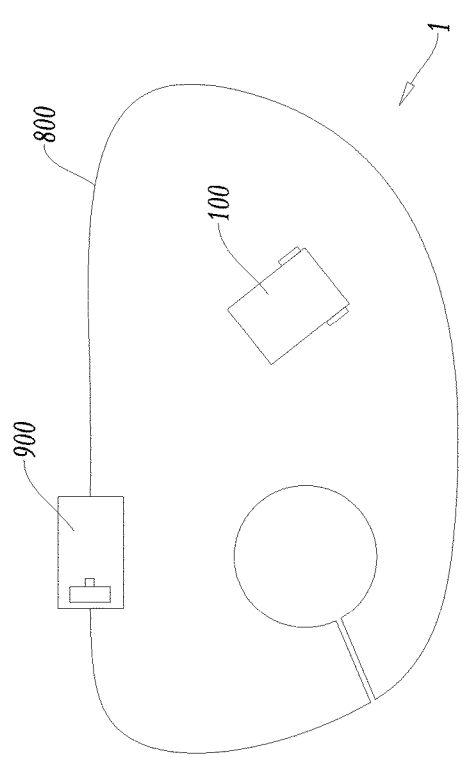
FIG. 16 is a schematic view of an autonomous operating system according to an embodiment of the present invention.

With reference to FIG. 16, this embodiment provides an autonomous operating system 1 comprising an autonomous operating apparatus 100, a docking station 900 and a boundary 800.

Said autonomous operating apparatus 100 is in particular a robot that can autonomously move around a predetermined area and perform a specific operation, typically such as an intelligent sweeper/vacuum cleaner that performs cleaning operations, or an intelligent lawn mower that performs lawn mowing operations. In particular, said specific operations refer to operations in which the work surface is treated so that the state of the work surface is changed. The present invention is described in detail using an intelligent lawn mower as an example. Said autonomous operating apparatus 100 can travel autonomously on the surface of the working area, and in particular as an intelligent lawn mower can autonomously carry out mowing operations on the ground. The autonomous operating apparatus 100 comprises at least a main body mechanism, a mobile mechanism, a working mechanism, an energy module, a detection module, an interaction module, a control module, etc.

Said mobile mechanism is configured for supporting said main body mechanism on the ground and driving said main body mechanism over the ground, and typically includes a wheeled mobile mechanism, a tracked or half-tracked mobile mechanism, or a walking mobile mechanism, for example. In this embodiment, said mobile mechanism is a wheeled mobile mechanism, comprising at least one driving wheel 2001 and at least one mobile prime mover. The mobile prime mover is preferably an electric motor, in other embodiments it may also be an internal combustion engine or a machine that uses other types of energy to generate power. In this embodiment, preferably a left driving wheel, a left travel prime mover driving said left driving wheel, a right driving wheel and a right travel prime mover driving said right driving wheel are provided. In this embodiment, the straight movement of said autonomous working apparatus is achieved by simultaneous and equal rotation of the left and right driving wheels, and the steering movement is achieved by simultaneous and differential or opposite rotation of the left and right driving wheels. In other embodiments, the mobile mechanism may further comprise a steering mechanism independent of said driving wheels and a steering prime mover independent of said mobile prime mover. In this embodiment, said mobile mechanism further comprises at least one driven wheel 2002, said driven wheel 2002 being typically configured as a caster, said driving wheel 2001 and said driven wheel 2002 being located at the front and rear ends of the autonomous operating equipment, respectively.

Said working mechanism is configured for performing specific operational tasks and comprises a working member and a working prime mover for driving said working member. Exemplarily, in the case of an intelligent sweeper/vacuum cleaner, said working member comprises a roller brush, a vacuum tube and a dust collection chamber, etc.; in the case of an intelligent lawn mower, said working member comprises a cutting blade or a cutting disc, and further comprises other components for optimising or adjusting the cutting effect, such as a height adjustment mechanism for adjusting the cutting height. Said working prime mover is preferably an electric motor, in other embodiments it may also be an internal combustion engine or a machine using other types of energy to generate power. In some other embodiments, the working prime mover and the mobile prime mover 110 are configured as the same prime mover.

Said main body mechanism typically comprises a chassis 20 and a housing 10, said chassis 20 being used to mount and/or hold functional mechanisms and functional modules such as the mobile mechanism, the working mechanism, the energy module, the detection module, the interaction module, the control module, etc. Said housing 10 is usually configured to at least partially cover said chassis 20, mainly to enhance the aesthetics and recognition of the autonomous operating apparatus 100. In this embodiment, said housing 10 is configured to be resettably translatable and/or rotatable with respect to said chassis 20 in response to external forces and, in conjunction with appropriate detection modules, such as Hall sensors, for example, may further serve to sense collisions, lifting and other events.

Said energy module is configured to provide energy for the various operations of the autonomous operating apparatus 100. In this embodiment, said energy module comprises a battery and a charging connection structure, wherein the battery is preferably a rechargeable battery and the charging connection structure is preferably a charging electrode that can be exposed outside the autonomous operating apparatus.

Said detection module is configured to sense at least one type of sensor of the environmental parameters to which the autonomous operating apparatus 1000 is exposed or of its own operating parameters. Typically, the detection module may comprise sensors related to the limitation of the working area, such as magnetic induction, collision, ultrasonic, infrared, radio and various other types, the type of sensors being adapted to the location and number of the corresponding signal generating devices. The detection module may also include sensors related to positioning navigation, such as GPS positioning devices, laser positioning devices, electronic compasses, acceleration sensors, odometers, angle sensors, geomagnetic sensors, etc. The detection module may also include sensors related to the operational safety of the autonomous operating apparatus, e.g. obstacle sensors, lift sensors, battery pack temperature sensors, etc. The detection module may also include sensors related to the external environment, such as ambient temperature sensors, ambient humidity sensors, light intensity sensors, rain sensors, etc.

Said interaction module is configured to at least receive control command information entered by the user, to send information that needs to be perceived by the user, to communicate with other systems or devices to send and receive information, etc. In this embodiment, the interaction module comprises an input device provided on the autonomous operating apparatus 100 for receiving control command information input by the user, typically such as a control panel, an emergency stop button, etc. The interaction module also comprises a display, an indicator and/or a buzzer provided on the autonomous operating apparatus 100 to enable the user to perceive information by illuminating or sounding. In other embodiments, the interaction module includes a communication module provided on the autonomous operating apparatus 100 and a terminal device independent of the autonomous operating apparatus 100, such as a mobile phone, a computer, a web server, etc., where the user's control command information or other information can be entered on the terminal device and arrive at the autonomous operating apparatus 100 via the wired or wireless communication module.

Said control module typically comprises at least one processor and at least one non-volatile memory, said memory containing a pre-written computer program or set of instructions, the processor controlling the execution of actions such as moving, working, etc. of the autonomous operating apparatus 100 in accordance with said computer program or set of instructions. Further, said control module is also able to control and adjust the corresponding behaviour of the autonomous operating apparatus 100, modify the parameters in said memory, etc., according to signals from the detection module and/or user control commands.

Said boundary 800 is used to limit the working area of the robotic system and typically comprises an outer boundary 8001 and an inner boundary 8002. the autonomous operating apparatus 100 is defined to move and work within said outer boundary 8001, outside said inner boundary 8002 or between said outer boundary 8001 and the inner boundary 8002. Said boundaries may be physical, typically such as walls, fences, railings, etc.; said boundaries may also be virtual, typically such as a virtual electronic fence emitted by a boundary signal generating device, said boundary signal typically being an electromagnetic or optical signal, or a virtual boundary set in an electronic map exemplarily formed by two or three dimensional coordinates, for autonomous operating apparatus 100 provided with a positioning device. In this embodiment, the boundary 800 is constructed as a virtual electronic fence, generated by a closed energized wire electrically connected to the boundary signal generating device, which is usually located in the docking station 900.

Said docking station 900 is typically configured on or within the boundary 800 for the autonomous operating apparatus 100 to be docked, and in particular to be able to supply energy to the autonomous operating apparatus 100 docked at the docking station.

Figures 1, 2, 3:
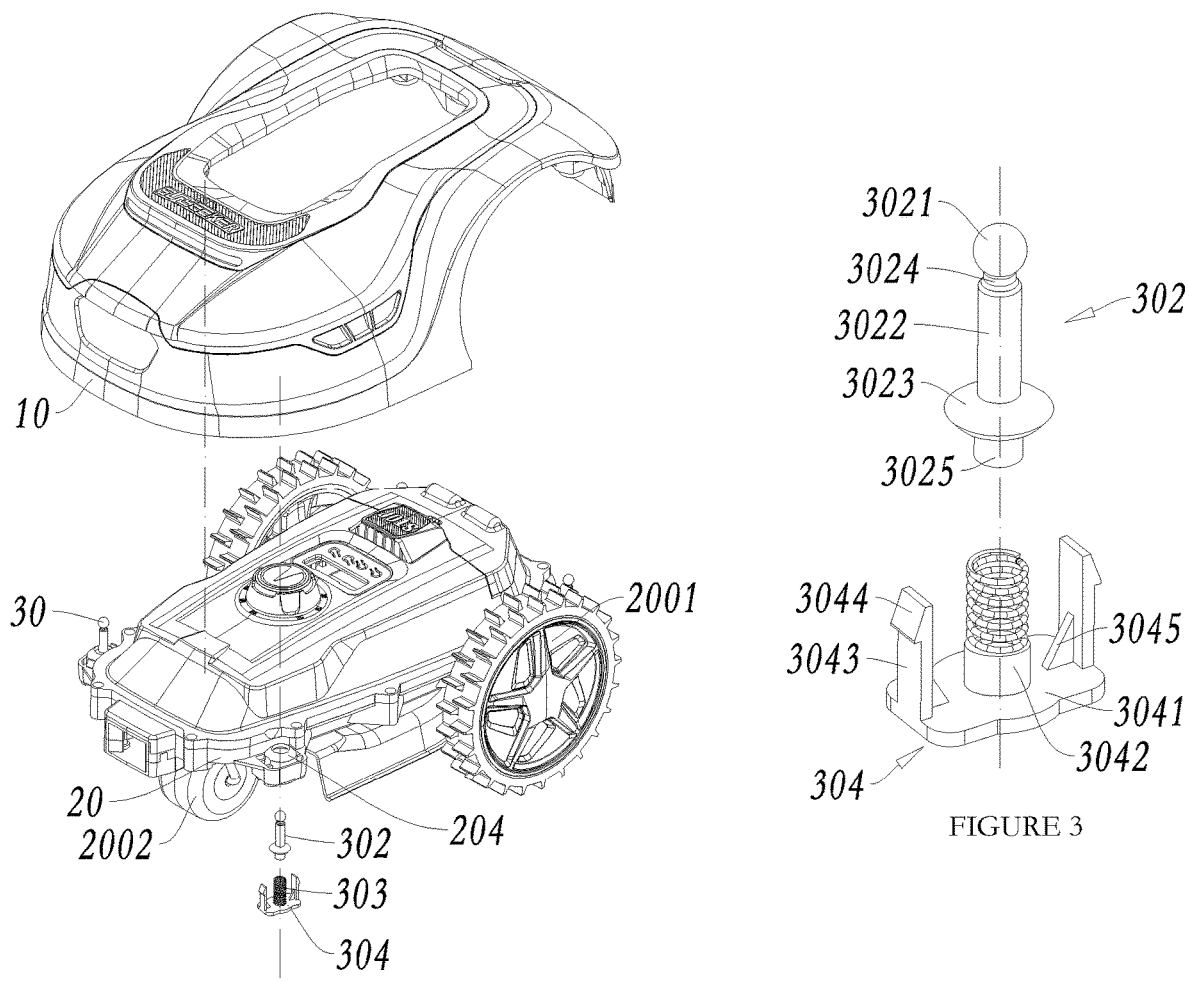
FIG. 1 is a schematic diagram of an autonomous operating apparatus according to an embodiment of the present invention.
FIG. 2 is a schematic diagram of an exploded view of an autonomous operating apparatus according to an embodiment of the present invention.
FIG. 3 is a schematic diagram of an exploded view of the attachment units between the housing and the chassis of the autonomous operating apparatus according to an embodiment of the present invention.

In a specific embodiment of the present invention, as shown in FIG. 1 to FIG. 2, autonomous operating apparatus 100 includes a main body mechanism, the main body mechanism includes a first main body portion and a second main body portion, and the first main body portion is movably connected to the second main body portion. In this embodiment, the first main body portion is configured as a housing 10, and the second main body portion is configured as a chassis 20. In other embodiments, the first main body portion is configured as a chassis 20, and the second main body portion is configured as a housing 10. In this embodiment, the chassis 20 and the housing 10 movably connected to the chassis 20 are provided. The housing 10 is movably connected to the chassis 20 via an attachment unit 30, so that the housing 10 can move relative to the chassis 20, for example, generating displacement. The chassis 20 is provided with a motion detection device, which is particularly suitable for detecting the displacement of the housing 10, so that when the housing 10 moves relative to the chassis 20, such as generating displacement, the motion detection device detects the motion and transmits a relevant signal to the control module, therefore, when the lawn mower is, for example, impacted or artificially lifted up, the control module can react correspondingly to control the action of the autonomous operating apparatus, such as stopping working or retreating. In one embodiment, the motion detection device includes a permanent magnet and a magnetic induction element, which are respectively arranged at corresponding positions of the housing 10 and the chassis 20. In the case of collision, the housing 10 leaves its initial position, and the magnetic induction element arranged on the chassis 20 senses the change in the position of the permanent magnet arranged on the housing 10, that is, outputs a signal representing a collision event to the control module, thereby controlling the action of the autonomous operating apparatus. The above-mentioned motion detection device and the control module are common technical means in this art, and can use the known prior art or technology to be developed, thus will not be described in detail here.

Figure 4:
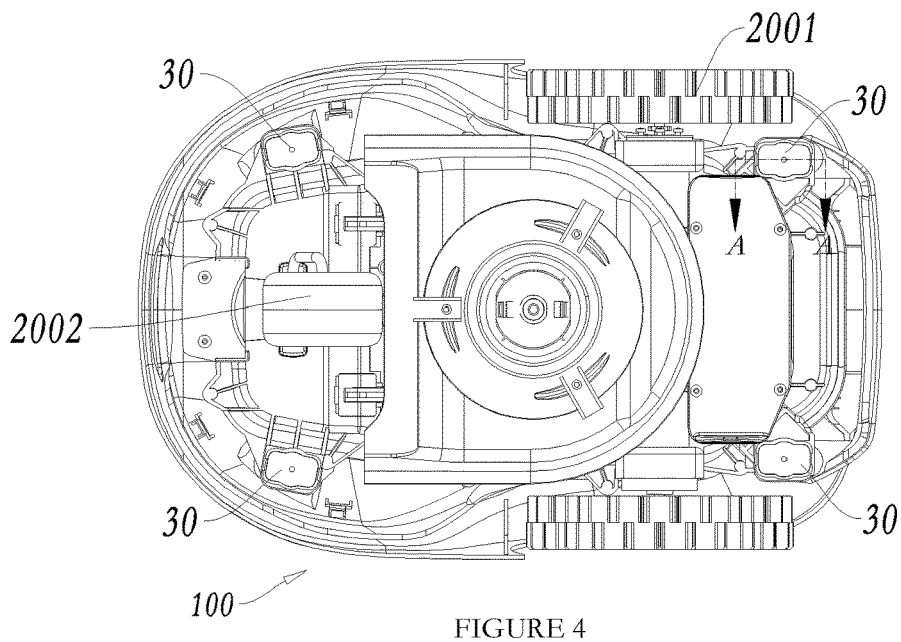
FIG. 4 is an elevation view of the autonomous operating apparatus according to an embodiment of the present invention.
Figure 5:
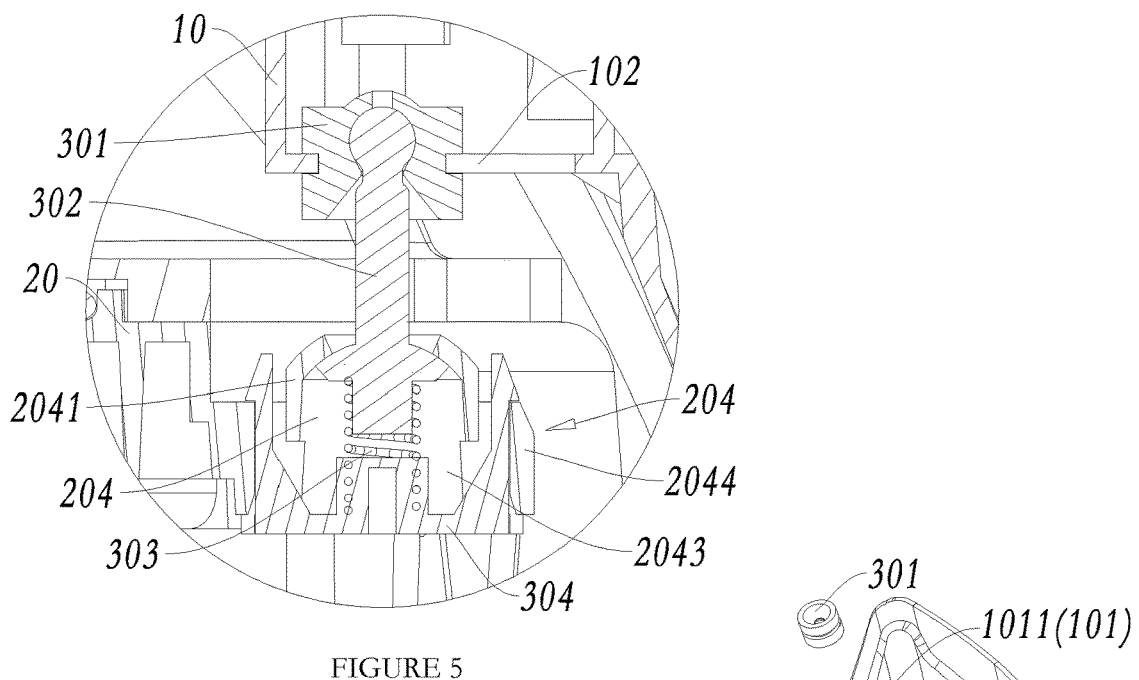
FIG. 5 is a partial sectional view with an A-A cut along the section line in FIG. 4.

As shown in FIG. 3 to FIG. 5, in this embodiment, the attachment unit 30 is provided with a connecting sleeve 301, a first mating member 302, a spring 303 and a second mating member 304. The connecting sleeve 301 is detachably connected to the housing 10. The first mating member 302 is generally configured to be rod-shaped, and the first end of the first mating member is movably connected to the connecting sleeve 301. In the embodiment shown in these figures, the first end of the first mating member 302 is the upper end of the first mating member 302. The first mating member 302 can also be movably installed on the chassis 20. The second mating member 304 is fixedly connected to the chassis 20 and is located below the first mating member 302. The spring 303 is installed between the first mating member 302 and the second mating member 304, that is, the spring 303 is clamped and fixed by the first mating member 302 and the second mating member 304. The spring 303 is used for driving the housing 10 to restore relative to the chassis 20 after a collision. Via the attachment unit 30, when the housing 10 is impacted or lifted up artificially, the housing 10 can generate displacement and/or rotate relative to the chassis 20 along the horizontal direction and/or vertical direction. Specifically, the first mating member 302 can rotate relative to the connecting sleeve 301, and then rotate relative to the housing 10. The first mating member 302 can also rotate relative to the chassis 20. As a result, the housing 10 can rotate relative to the chassis 20. Further, the first mating member 302 can also move up and down relative to the chassis 20 along the vertical direction, so that the housing 10 can move up and down relative to the chassis 20 along the vertical direction.

Specifically, referring to FIG. 5 to FIG. 8, the connecting sleeve 301 is approximately cylindrical. The peripheral wall of the connecting sleeve 301 is provided with an annular groove 3011. A hollow space is arranged inside the connecting sleeve 301. The hollow space is, from top to bottom, composed of a holding portion 3012 and an opening portion 3013 which opens downwards. The holding portion 3012 and the opening portion 3013 are conjoined with each other and a necking portion 3014 is arranged between them. The holding portion 3012 is a substantially spherical hollow space. The opening portion 3013 is a conical hollow space. The size of the necking portion 3014 is narrowed relative to the holding portion 3012 and is narrowed relative to the opening portion 3013. Thereby, the head of the first mating member 302 can pass through the opening portion 3013 and the necking portion 3014 in sequence, and is rotatably hold in the holding portion 3012, so that the first mating member 302 is rotatably connected to the connecting sleeve 301. The conical space of the opening portion 3013 allows the first mating member to swing within the space. The top end of the connecting sleeve can also be provided with a vent hole 3015.

Figure 6:
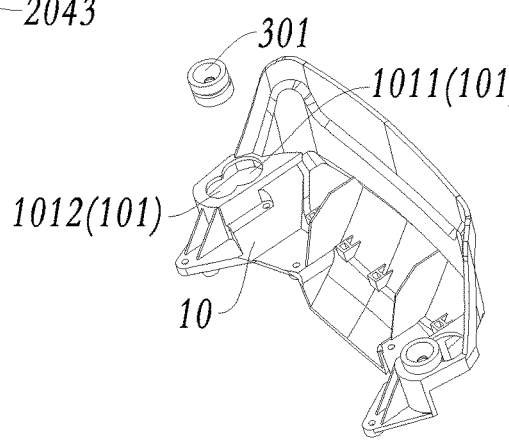
FIG. 6 is an exploded schematic view of a part of the housing of the autonomous operating apparatus of FIG. 1, showing the connection structure between the connecting sleeve and the housing.
Figure 7:
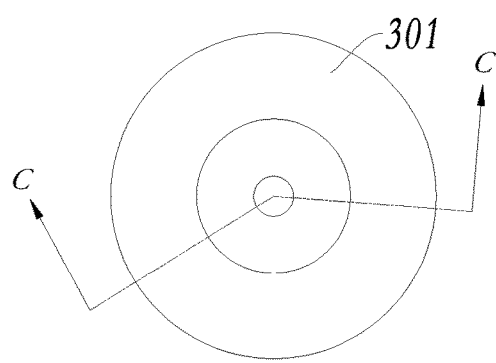
FIG. 7 is a top view of the connecting sleeve according to an embodiment of the present invention.
Figure 8:
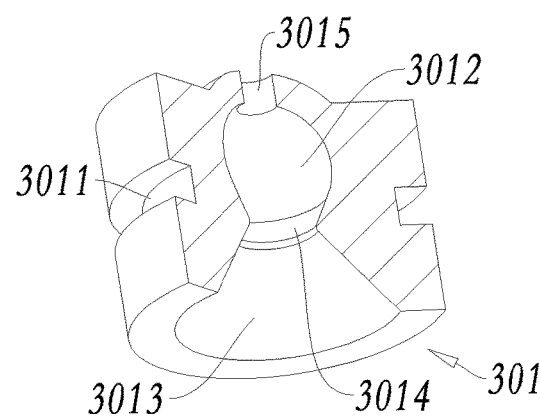
FIG. 8 is a sectional view with a C-C cut along the section line in FIG. 7.

As shown in FIG. 5 to FIG. 6, the housing 10 is provided with a mounting hole 101. The mounting hole 101 is composed of two circular holes, which conjoined and intersect with each other and have different diameters. The diameter of the larger circular hole 1011 is slightly greater than the outer diameter of a non-groove location of the connecting sleeve 301, and the diameter of the smaller circular hole 1012 is less than the outer diameter of the non-groove location of the connecting sleeve and is slightly greater than the outer diameter of a groove location. Therefore, during assembly, the connecting sleeve 301 first enters the larger circular hole 1011 along the axial direction, and then the connecting sleeve 301 moves radially toward the smaller circular hole 1012, so that the annular groove 3011 on the connecting sleeve is clamped into a protrusion portion 102 on the housing 10 to complete the installation of the connecting sleeve 301. Preferably, the connecting sleeve 301 is made of elastic materials such as rubber materials. It should be understood that the connecting sleeve 301 can also be made of other materials with certain elasticity such as plastic materials.

In other embodiments, a groove can also be arranged on the housing, an annular protrusion portion is arranged on the outer wall of the connecting sleeve, and the connecting sleeve is installed on the housing 10 via the cooperation of the annular protrusion portion and the groove. The connecting sleeve 301 can also be installed on the housing 10 in other ways. For example, the connecting sleeve is provided with a buckle structure and is installed on the housing 10 by buckling. In another embodiment, it is also possible to not have a separate connection sleeve, but to have a structure similar to the above-mentioned holding, opening and necking portions on the connection sleeve 301 formed in one piece on the housing.

As shown in FIG. 3 and FIG. 5, the first mating member 302 is provided with a head 3021, a rod portion 3022 and a shoulder 3023 in sequence from top to bottom. The head 3021 is arranged at the top end of the first mating member 302 and is spherical. The rod portion 3022 is rod-shaped, and the cross section of the rod portion is preferably circular. The diameter of the head 3021 is greater than the diameter of the rod portion 3022. A neck 3024 is arranged between the head 3021 and the rod portion 3022. The neck 3024 is narrowed relative to the rod portion, that is, the diameter of the neck 3024 is less than the diameter of the rod portion.

The shoulder 3023 extends radially outwards relative to the outer side wall of the rod portion 3022, and is formed in a substantially circular ring shape. Preferably, the upper surface of the shoulder 3023 is configured as at least a part of a spherical surface. The lower surface of the shoulder 3023 is recessed to conveniently hold the spring 303. A spring connecting portion 3025 extends out from the lower surface of the shoulder 3023 for mounting the first end of the spring 303. In the embodiment shown in the figures, the first end of the spring 303 is the upper end of the spring 303, and the second end of the spring 303 is the lower end of the spring 303. In this embodiment, the spring connecting portion 3025 is located at the lower end of the first mating member below the shoulder, that is, at the second end of the first mating member, specifically as a mounting post 3025 integrally extending from the lower surface of the shoulder 3023. It should be understood that the spring connecting portion 3025 may also be of other construction, as long as it is capable of being connected to one end of the spring 303. The spring 303 may also be replaced by other elastic members, as long as they are capable of driving the housing 10 back relative to the chassis 20 after a collision.

Figure 9:
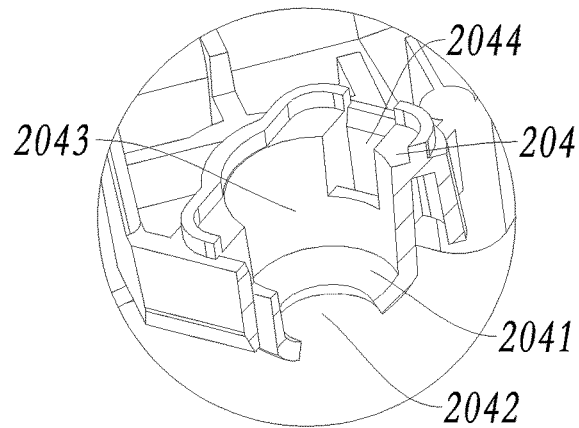
FIG. 9 is a schematic view of a part of a chassis according to an embodiment of the present invention, showing the structure of the chassis connecting portions.

As shown in FIG. 2, FIG. 5 and FIG. 9, a plurality of chassis connecting portions 204 are arranged on the chassis 20. The chassis connecting portions 204 are located on the outer edge of the chassis. Each chassis connecting portion 204 is provided with a mounting wall 2041 that is integrally formed on the chassis 20. The central part of the mounting wall 2041 has a through hole 2042 for the first mating member 302 to pass through. The lower surface of the mounting wall 2041 is configured as at least a part of a spherical surface, and is adapted to the upper surface of the shoulder 3023 of the first mating member 302, so that when the housing 10 displaced, the upper surface of the shoulder can move relatively leaning against the lower surface of the mounting wall 2041. A holding cavity 2043 is arranged below the mounting wall 2041 for holding the spring 303. Slots 2044 are formed in the two sides of the holding cavity 2043 and are configured to cooperate with hooks on the second mating member 304, so as to fix the second mating member 304 on the chassis 20 and to locate the spring 303 in the holding cavity 2043.

Referring to FIG. 3 and FIG. 6, the second mating member 304 is provided with a plate-shaped main body 3041. The shape of the plate-shaped main body 3041 is set to match the shape of the open end of the holding cavity 2043 so as to cover the open end of the holding cavity when assembled. In this embodiment, the open end is the lower end of the holding cavity. A protruding convex column 3042 is arranged at the middle of the upper surface of the plate-shaped main body 3041. An elastic arm 3043 respectively extends upwards from the upper surface of the plate-shaped main body 3041 on two opposite sides, and a hook 3044 is arranged at the tail end of the elastic arm 3043, and the hook 3044 and the slot 2044 of the chassis together form a buckle structure to clamp the second mating member 304 on the chassis 20. A reinforcing rib 3045 is connected between the elastic arm 3043 and the plate-shaped main body 3041. In other embodiments, the second mating member 304 can also be connected to the chassis 20 in other forms. For example, the second mating member 304 can be attached to the chassis 20 by means of screws, rivets, adhesives, hot melt welding and the like.

As shown in FIG. 6, the upper end of the spring 303 is connected to the spring connecting portion 3025 of the first mating member 302, and the lower end of the spring 303 is integrally formed with the second mating member 304, so that the spring and the second mating member can be used as an integral part during the assembly of the whole machine, thereby reducing the assembly procedures of the whole machine and lowering the cost, and this non-detachable connection mode has better stability. Specifically, in this embodiment, the spring connecting portion 3025 is provided with a spiral groove adapted to the spring 303, and the spring 303 is fixedly connected to the spring connecting portion 3025 via the spiral groove. In this embodiment, the lower end of the spring 303 is configured to be non-detachably connected to the second mating member 304, the non-detachable connections described here typically mean that they are not detachable without damaging the structure of the second mating member 304 and/or the spring 303 itself. In this embodiment, the spring 303 is made of metal, the second mating member 304 is made of plastic, and the lower end of the spring 303 is injection-moulded into the convex column 3042, so that the spring 303 and the second mating member 304 have an integrally formed structure. In other embodiments, the lower end of the spring 303 is connected to at least a portion of the second mating member 304 by interference. Specifically, the inner diameter of the spring 303 is slightly less than that of the convex column 3042, and the spring 303 can be sleeved on the periphery of the convex column 3042 in an interference fit manner; or, the convex column 3042 is configured to be ring-shaped, the outer diameter of the spring 303 is slightly less than the inner diameter of the convex column 3042, and the convex column 3042 can be sleeved on the periphery of the convex column 3042 in the interference fit manner. The interference is at least sufficient to ensure that the spring 303 does not separate from the second mating member 304 when subjected to a separation force of not less than the weight of the autonomous operating apparatus; and preferably said interference is capable of satisfying that the spring 303 will not separate from the second mating member 304 when the separation force applied is not sufficient to damage the second mating member 304 and/or the spring 303. In other embodiments, the lower end of the spring 303 is connected to the second mating member 304 by an adhesive that is at least capable of satisfying that the adhesive structure will not be damaged when subjected to a separation force of no less than the weight of the autonomous operating apparatus. In this embodiment, the housing 10 and the chassis 20 are connected to each other via four attachment units 30. It should be understood that the housing 10 and the chassis 20 can be connected to each other by using other numbers of attachment units 30, for example, 3, 5 or more.

The steps of assembling the housing 10 and the chassis 20 by using the above-mentioned attachment unit 30 are as follows: S1, mounting the connecting sleeve 301 on the housing 10, and connecting the spring 303 with the first mating member 302; S2, inserting the head 3021 of each first mating member into the chassis connecting portion 204 from bottom to top, and passing through the through hole 2042 of the mounting wall until the shoulder 3023 of the first mating member 302 abuts against the lower surface of the mounting wall of the chassis connecting portion 204, and clamping the hook 3044 of the second mating member with the slot 2044 of the chassis; and S3, placing the housing 10 over the chassis 20, align the connecting sleeve 301 with the head 3021 of the first mating member and press it downwards so that the head 3021 enters the holding portion 3012, thus completing the assembly.

In the above structure and during the assembling process, the second mating member 304 and the spring 303 are integrally formed, and the spring 303 and the first mating member 302 are fixedly connected by the spiral groove, so that the second mating member 304, the spring 303 and the first mating member 302 can be assembled quickly, and the two ends of the spring 303 are firmly connected to the second mating member 304 and the first mating member 302 respectively, therefore the assembly efficiency of the attachment unit can be greatly improved, and the structure is relatively simple, so the operation is more reliable and the cost is lower.

After assembly, the head 4021 of the first mating member is rotatable relative to the connecting sleeve 301, and the first mating member 402 is movable up and down or rotatable over the elastic force of the spring, whereby the first mating member 402 is rotatable and/or movable up and down and left and right relative to the chassis. This allows the housing 10 to move relative to the chassis 20, e.g. translate and/or rotate, in the event that the housing 10 encounters an abnormal situation during operation, e.g. when it collides with a foreign object or is lifted artificially, thus triggering the control module to act accordingly and control the autonomous operating apparatus to stop working and/or retreat. Further, after the abnormal situation has been cleared, the autonomous operating apparatus can be restored to a workable state by the resetting action of the spring 403.

Figure 17:
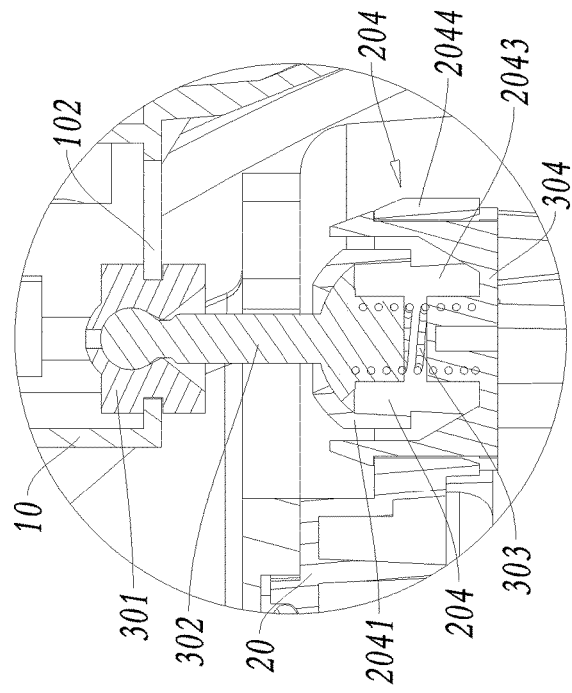
FIG. 17 is a partial sectional view of an autonomous operating apparatus according to another embodiment of the present invention.

As a modification and improvement of the foregoing embodiment, FIG. 17 shows autonomous operating apparatus 100 according to another specific embodiment of the present invention. The technical solution of this embodiment is similar to the technical solution shown in FIG. 5, except that the first end of the spring 303 and the lower end of the first mating member 302 are non-detachably connected, and preferably are formed by one-piece injection-moulding. The identical part of the technical solution of this embodiment to those shown in FIG. 5 will not be repeated here. The use of the technical solutions in this implementation can further simplify the structure, improve assembly efficiency, increase reliability and reduce costs.

Figure 11:
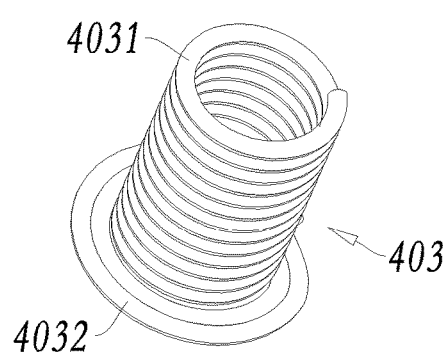
FIG. 11 is a schematic view of the spring in FIG. 10.
Figure 10:
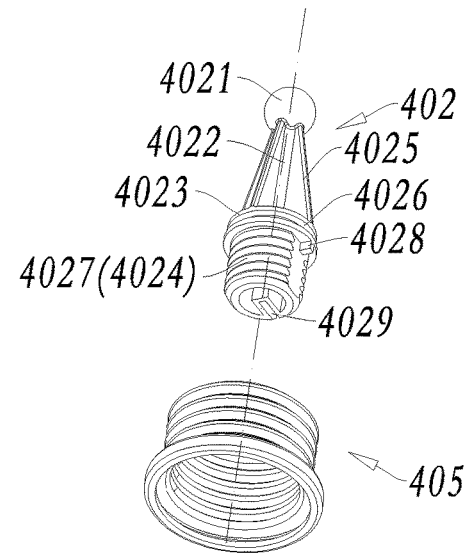
FIG. 10 is an exploded schematic view of the attachment units between the housing 10 and the chassis of an autonomous operating apparatus according to another embodiment of the present invention.

FIG. 10 to FIG. 12 show autonomous operating apparatus 100 according to another specific embodiment of the present invention. The main differences between this embodiment and the embodiment shown in FIG. 1 to FIG. 9 lie in the structure of the attachment unit and the corresponding structures of the housing and the chassis. Therefore, for the sake of brevity, the attachment unit 30 and related structures of this embodiment are mainly described here and no other structures will be described in detail.

As shown in FIG. 10 and FIG. 12, the attachment unit 30 includes a connecting sleeve 301, a first mating member 402, a spring 403, a second mating member 404 and a rubber sleeve 405. The connecting sleeve 301 is detachably connected to the housing 10. The first end of the first mating member 402 is movably connected to the connecting sleeve 301. The first mating member 402 is also movably installed on the chassis 20 via the spring 403. The second mating member 404 is fixedly connected to the chassis 20 and is provided with a through hole 4044. The first end of the spring 403 passes through the through hole 4044 from bottom to top and is connected to the second end of the first mating member 402. In the embodiment shown in the figures, the first end of the first mating member 402 is the upper end of the first mating member 402, and the second end of the first mating member 402 is the lower end of the first mating member 402. The second end of the spring abuts against the lower end of the second mating member 404. In the embodiment shown in the figures, the first end of the spring 403 is the upper end of the spring 403, and the second end of the spring 403 is the lower end of the spring 403. The spring 403 is used for driving the housing 10 back relative to the chassis 20 after a collision. The lower end of the rubber sleeve 405 is connected to the upper end of the second mating member 404, and the upper end of the rubber sleeve is connected to the first mating member 402. The rubber sleeve at least surrounds the part of the spring 403 that extends out from the upper side of the second mating member 404. The rubber sleeve 405 mainly serves as a dust and foreign body barrier. It should be understood that the rubber sleeve can also be eliminated.

Via this attachment unit 30, the housing 10 is translatable and/or rotatable relative to the chassis 20 in a horizontal and/or vertical direction when the housing 10 is impacted or when it is artificially lifted. Specifically, the first mating member 402 can rotate relative to the connecting sleeve 301, and then rotate relative to the housing 10. The first mating member 402 can also rotate relative to the chassis 20. Thus, the housing 10 can translate and/or rotate relative to the chassis 20. Further, the first mating member 402 can also translate relative to the chassis 20 along the vertical direction, so that the housing 10 can translate relative to the chassis 20 along the vertical direction.

Specifically, the structures of the connecting sleeve 301 and the corresponding mounting hole 101 on the housing 10 are the same as the structures and installation modes of the connecting sleeve 301 and the mounting hole 101 in the embodiment shown in FIG. 1 to FIG. 9, and thus will not be described in detail here. Similarly, in this embodiment, the connecting sleeve 301 is preferably made of rubber. The connecting sleeve 301 is also available in different structures. For example, the connecting sleeve is provided with a buckle structure and is installed on the housing 10 by means of clamping. In another embodiment, it is also possible to not have a separate connecting sleeve, but to have a structure similar to the above-mentioned housing, opening and necking section on the connection sleeve 301 formed in one piece on the housing 10.

As shown in FIG. 10 and FIG. 12, the first mating member 402 is provided with a head 4021, a rod portion 4022, a groove portion 4023 and a spiral portion 4024 in sequence from top to bottom. The head 4021 is arranged at the top end of the first mating member 402 and is spherical. The rod portion 4022 is rod-shaped, and the outer wall of the rod portion 4022 is provided with a reinforcing rib 4025. The groove portion 4023 is located at the lower end of the rod portion 4022 and is provided with an annular groove 4026. The spiral portion 4024 is located below the groove portion 4023 and is cylindrical. The spiral portion 4024 is used for mounting the spring 403. The outer wall of the spiral portion 4024 is provided with a spiral groove 4027. The top end of the spiral portion 4024 is provided with a protrusion 4028 protruding radially from the outer wall of the spiral portion. The protrusion 4028 is used for abutting the end face of the spring when it is tightened, ensuring that each spring is tightened to the same degree. The spiral portion 4024 is hollow inside and has a recess 4029 running 64 through the outer wall of the spiral portion. The recess 4029 is used for reducing the outer diameter of the first mating member 402 when a force is applied. Specifically, when no force is applied, the outer diameter of the first mating member 402 is slightly larger than the inner diameter of the spring, and when connected, the outer diameter of the first mating member is reduced by force and the spring can be sleeved and screwed onto the outside of the first mating member. Due to the elasticity of the first mating part itself, it is able to clamp the spring to prevent it from coming loose.

As shown in FIG. 4 and FIG. 12, a plurality of chassis connecting portions 204 are arranged on the chassis 20. The chassis connecting portions 204 are located on the outer edge of the chassis. Each chassis connecting portion 204 is provided with a holding cavity 2021 that is integrally formed at the opening of the chassis 20, and the holding cavity is a concave cavity. A convex column 2022 is arranged at the middle of the holding cavity 2021. The lower end of the spring 403 is sleeved on the convex column 2022, and preferably, the spring 403 is in interference fit with the convex column 2022. The both sides of the holding cavity 2021 are provided with slots 2023, which are configured to cooperate with the hooks on the second mating member 404, thereby fixing the second mating member 404 on the chassis 20 and locating the lower end of the spring 403 in the holding cavity 2021, which will be further illustrated below.

Continuing to refer to FIG. 10 and FIG. 12, the second mating member 404 is provided with a main body 4041, and the main body 4041 is preferably configured to be plate-shaped. The shape of the main body 4041 is set to match the shape of the open end of the holding cavity 2021 to cover the open end of the holding cavity when assembly. In this embodiment, the open end is the upper end of the holding cavity. A groove portion 4042 is arranged at the middle of the upper surface of the main body 4041, and the groove portion is a boss integrally protruding upwards from the plate-shaped main body 4041. The outer side wall of the boss is provided with a groove 4043 for mounting the rubber sleeve 405. A convex column 4045 further integrally extends from the middle of the lower surface of the main body 4041. When being assembled, the bottom surface of the convex column 4045 presses against the bottom of the spring 403. A through hole 4044 is formed in the middle of the main body 4041 for the spring 403 to pass through. The through hole 4044 penetrates through the boss and the convex column 4045 described above. A pair of elastic arms 4046 respectively extends downwards from the lower surface of the main body 4041 on two opposite sides, and hooks 4047 are arranged at the tail ends of the elastic arms 4046. The hook 4047 and the slot 2023 of the chassis together form a buckle structure to clamp the second mating member on the chassis.

The spring 403 is configured as a variable-diameter spring. In this embodiment, the spring includes a first spring part and a second spring part, wherein the outer diameter of the first spring part is less than the outer diameter of the second spring part. There is usually a threshold, the maximum outer diameter of the first spring part is less than the threshold, and the minimum outer diameter of the second spring part is greater than or equal to the threshold. As shown in FIG. 10, the spring 403 is of one-piece construction, the first spring part is configured as a main body portion 4031, and the second spring part is configured as a bottom 4032 located below the main body portion. The main body portion 4031 is configured as a cylindrical spiral spring, preferably with parallel tightened, the inner diameter of the main body portion is adapted to that of the spiral groove of the spiral portion 4024 of the first mating member 402. The bottom 4032 is configured as a truncated cone spring or a flat spiral spring, or a cylindrical spiral spring. In some embodiments, the bottom 4032 is configured as a lug protruding outwards from the main body portion 4031, and preferably at least two lugs are configured. In some embodiments, the lug can also be configured at the middle of the main body portion 4031. In the embodiment in which the lug is provided, the spring 403 as a whole can be configured to have a constant inner diameter and outer diameter. The outer diameter of the main body portion 4031 of the spring 403 is not greater than the minimum inner diameter of the through hole 4044 of the second mating member 404, and preferably, the outer diameter of the main body portion 4031 is less than the minimum inner diameter of the through hole 4044; and the minimum inner diameter of the through hole of the second mating member 404 is less than the outer diameter of the bottom of the spring 403. Thus, the upper end of the spring 403 can pass through the through hole 4044 of the second mating member 404 to be connected with the spiral portion 4024 of the first mating member 402, and the lower end of the spring 403 is located below the through hole 4044 and abuts against the convex column 4045 of the second mating member 404. In other embodiments, the spring can be made of other elastic materials, the upper end of the spring main body portion 4031 includes an internal thread, and the spiral portion 4024 of the first mating member is provided with a corresponding external thread 4027. In other embodiments, the main body portion and the bottom of the spring 403 can also be formed separately and then connected together by methods such as welding, where the bottom of the spring 403 can be, for example, a disc or a circular ring. In other embodiments, the main body portion and the bottom of the spring 403 can be configured as cylindrical spiral springs with different outer diameters, wherein the outer diameter of the main body portion is less than the outer diameter of the bottom. The spring 403 can also be replaced by other elastic members, as long as it can drive the housing 10 back relative to the chassis after a collision.

Continuing to refer to FIG. 10, the rubber sleeve 405 is in the form of a corrugated pipe, and the diameter of the bottom end of which is greater than the diameter of the rest part. The rubber sleeve 405 is sleeved at the outside of the spring 403. The bottom end of the rubber sleeve 405 is connected to the groove 4043 of the boss of the second mating member 404, and the top end of the rubber sleeve 405 is connected to the groove 4026 of the groove portion 4023 of the first mating member 402. Thus, the rubber sleeve 405 can play a role of sealing and protecting the spring. In other embodiments, the rubber sleeve can also be eliminated.

In this embodiment, the housing 10 and the chassis 20 are connected to each other via four attachment units 30. It should be understood that the housing 10 and the chassis 20 can also be connected to each other by using other numbers of attachment units 30, for example, 3, 5 or more.

The steps of assembling the housing 10 and the chassis 20 by using the above-mentioned attachment unit 30 are as follows: S1, mounting the connecting sleeve 301 on the housing 10, and causing the main body portion 4031 of the spring to pass through the through hole 4044 of the second mating member from the lower side of the second mating member 404, so that the upper surface of the bottom 4031 of the spring abuts against the bottom surface of the convex column 4045 of the second mating member; at this time, since the second mating member 404 is not assembled with the chassis connecting portion 204 yet, although the through hole 4044 restricts the spring 301 from moving along the radial direction, the spring can still move downwards along the axial direction to depart from the second mating member 404; S2, buckling the second mating member 404 to the slot 2023 of the chassis downwards, sleeving the rubber sleeve 405 on the main body portion 4031 of the spring, so that the lower end of the rubber sleeve 405 is connected to the groove 4043 on the upper end of the second mating member; S3, cooperatively screwing the spiral portion 4024 of the first mating member with the upper end of the main body portion 4031 of the spring, and connecting the upper end of the rubber sleeve 405 to the groove 4026 of the first mating member; and S4, placing the housing 10 above the chassis 20, aligning and pressing the connecting sleeve 301 and the head 3021 of the first mating member downwards, so that the head 4021 enters the holding portion 3012, and then the assembly is completed.

After the chassis and the connecting structure are assembled, the bottom 4032 of the spring is at least partially clamped between the second mating member 404 and the chassis connecting portion 201, and the upper and lower ends of the spring 403 are fastened at this time. In the above-mentioned assembling process, the connection between the second mating member 404, the first mating member 402 and the spring 403 does not have fasteners such as screws, making assembly easy and tool-free. In addition, since the structure of the attachment unit is relatively simple, the operation is more reliable, and the cost is lower.

After assembly, the head 4021 of the first mating member is rotatable relative to the connecting sleeve 301, and the first mating member 402 is movable up and down or rotatable over the elastic force of the spring, whereby the first mating member 402 is rotatable and/or movable up and down and left and right relative to the chassis. This allows the housing 10 to move relative to the chassis 20, e.g. translate and/or rotate, in the event that the housing 10 encounters an abnormal situation during operation, e.g. when it collides with a foreign object or is lifted artificially, thus triggering the control module to act accordingly and control the autonomous operating apparatus to stop working and/or retreat. Further, after the abnormal situation has been cleared, the autonomous operating apparatus can be restored to a workable state by the resetting action of the spring 403.

FIG. 13 shows a partial structure of the attachment unit of the autonomous operating apparatus 16 according to another specific embodiment of the present invention, and specifically shows a third connecting structure. For the sake of brevity, only the differences from the embodiments described in FIG. 10 to FIG. 12 are schematically shown here, and the other identical or similar structures are not described in detail.

Referring to FIG. 13, in this embodiment, the chassis connecting portion 204 is configured to be located on the outer edge of the chassis 20 and is provided with a holding cavity 2021 that is integrally formed on the chassis 20, and the holding cavity is a concave cavity. The holding cavity 2021 has an open end, and the open end is located at the lower end of the holding cavity 2021. The holding cavity 2021 is further provided with a through hole 2051, and the through hole 2051 is located at the upper end of the holding cavity 2021. The attachment unit 30 includes a connecting sleeve, a first mating member, a spring 403 and a second mating member 404. The structures of the connecting sleeve and the first mating member are the same as those in the embodiment described above, and thus will not be repeated. The second mating member 404 is provided with a main body 4041. The main body 4041 is usually configured to be plate-shaped. The shape of the main body 4041 is configured to match the shape of the open end of the holding cavity 2021 so as to cover the open end of the holding cavity 2021 when assembled. A convex column 4045 extends from the middle of the upper surface of the main body 4041, and the convex column 4045 is configured such that when the second mating member 404 is assembled on the chassis connecting portion 204, the convex column 4045 is coaxial with the through hole 2051, and the outer diameter of the convex column 4045 is greater than the inner diameter of the through hole 2051. A pair of elastic arms 4046 respectively extends upwards from the lower surface of the main body 4041 on two opposite sides, and hooks 4047 are arranged at the tail ends of the elastic arms 4046. The hook 4047 and the slot 2023 of the chassis together form a buckle structure to clamp the second mating member 404 on the chassis 20. In other embodiments, the second mating member 404 and the chassis can also be connected in other ways, for example, via screws, rivets, gluing, fusion welding, or the like.

The spring 403 is configured to include a first spring part and a second spring part, wherein the first spring part is configured as a cylindrical spiral spring with a smaller outer diameter, and the second spring part is configured as a cylindrical spiral spring with a greater outer diameter, and the first spring part and the second spring part are configured to be coaxially and integrally formed. The outer diameter of the first spring part is not greater than the inner diameter of the through hole 2051, and preferably, the outer diameter of the first spring part is slightly less than the inner diameter of the through hole 2051. The inner diameter of the second spring part is adapted to the outer diameter of the convex column 4045. Preferably, the inner diameter of the second spring part is slightly greater than or equal to or slightly less than the outer diameter of the convex column 4045. Thus, the upper end of the spring 403 can pass through the through hole 2051 of the chassis connecting portion 204 to be connected to the spiral portion of the first mating member, and the lower end of the spring 403 is located below the through hole 2051 and abuts against the convex column 4045 of the second mating member 404. Typically, when the second mating member 404 is assembled on the chassis connecting portion 204, the clearance distance between the lower end face of the through hole 2051 and the upper surface of the convex column 4045 is adapted to the wire diameter of the spring 403, so that at least a part of the second spring part can be clamped and fixed between the chassis connecting portion 204 and the second mating member 404.

The steps of assembling the housing 10 and the chassis 20 by using the above-mentioned attachment unit 30 are as follows: S1, mounting the connecting sleeve 301 on the housing 10, and causing the first spring part to pass through the through hole 2051 from the lower side of the chassis mounting portion 204, so that the upper surface of the second spring part abuts against the periphery of the lower end face of the through hole 2051, at this time, since the second mating member 404 is not assembled with the chassis connecting portion 204 yet, although the through hole 2051 restricts the spring 403 from moving along the radial direction, the spring can still move downwards along the axial direction to depart from the chassis mounting portion 204; S2, buckling the second mating member 404 to the slot 2023 of the chassis upwards; S3, cooperatively screwing the spiral portion 4024 of the first mating member with the upper end of the first spring part; and S4, placing the housing 10 above the chassis 20, aligning and pressing the connecting sleeve 301 and the head 4021 of the first mating member downwards, so that the head 4021 enters the holding portion 3012, and then the assembly is completed.

In other embodiments, the above-mentioned step S1 includes mounting the connecting sleeve 301 on the housing 10, and sleeving the second spring part on the convex column 4045 of the second mating member 404. At this time, since the second mating member 404 is not assembled with the chassis connecting portion 204 yet, although the convex column 4045 restricts the spring 403 from moving along the radial direction, the spring can still move upwards along the axial direction to depart from the second mating member 404. In some embodiments, even if there is a slight magnitude of interference in the fit between the spring 403 and the convex column 4045, it is obvious that non-destructive disassembly can be achieved.

Figure 18:
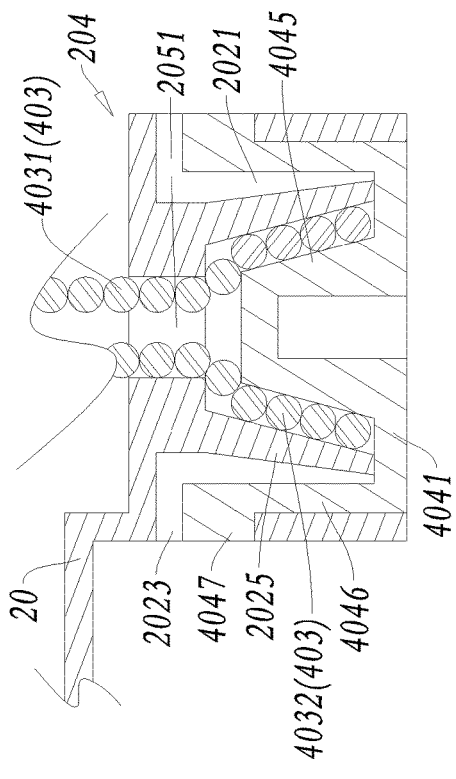
FIG. 18 is a partial sectional view of an autonomous operating apparatus according to another embodiment of the present invention.

As a modification and improvement of the above-mentioned embodiment, FIG. 18 shows a partial structure of the attachment unit 30 of autonomous operating apparatus 10 of another specific embodiment, specifically shows a third connecting structure. The technical solution of this embodiment is similar to the technical solution shown in FIG. 13, except that the spring 403 includes a first part 4031 of elastic member and a second part 4032 of elastic member, wherein the first part 4031 of elastic member is configured as a spiral spring with a smaller outer diameter, and further has a constant outer diameter, the "constant" herein refers to constancy within an engineering allowable error range, and is not limited to constancy in an absolute sense. The second part 4032 of elastic member is configured as a spiral spring with a taper, the outer diameter and/or the inner diameter of the second part 4032 of elastic member continuously increases along a direction away from the first part 4031 of elastic member, and preferably continuously and linearly increases. Further, the minimum outer diameter and/or the minimum inner diameter of the second part 4032 of elastic member is greater than the outer diameter of the first part 4031 of elastic member. In other embodiments, the outer diameter and/or the inner diameter of the second portion 4032 of elastic member discontinuously increases along the direction away from the first part 4031 of elastic member. Correspondingly, the outer surface of the convex column 4045 is configured to have a taper corresponding to the inner diameter of the second part 4032 of elastic member, so that the convex column and the second part of elastic member can form adaptive socket connection, preferably, the socket connection is interference socket connection, the interference here particularly refers to an interference connection that has a smaller magnitude of interference and can achieve a certain degree of fixation and non-destructive disassembly. Further correspondingly, the chassis mounting portion 204 further includes a convex ring 2045, and the inner cavity of the convex ring 2045 is configured to have a taper corresponding to the outer diameter of the second part 4032 of elastic member, so that the convex ring and the second part of elastic member can form adaptive socket connection, and preferably, the socket connection is interference socket connection. In this way, when the convex column 4045 of the second mating member 404 is assembled with the chassis mounting portion 204, the second part 4032 of elastic member is clamped and fixed between the convex column 4045 and the mating surface of the convex ring 2045, and since the mating surface has a taper, the mating surface can fully close the gap to ensure the stability of installation and fixation. In other embodiments, the convex column 4045 can be configured on the chassis mounting portion 204, and the convex ring 2045 is correspondingly configured on the second mating member 404.

FIG. 14 shows a partial structure of the attachment unit 30 of autonomous operating apparatus 10 of another specific embodiment, specifically shows a third connecting structure. For the sake of brevity, only the differences in the embodiment shown in FIG. 10 to FIG. 12 or the embodiment shown in FIG. 13 are schematically shown here, and the other identical or similar structures are not described in detail.

Referring to FIG. 14, in this embodiment, the spring 403 is configured to include a first spring part and a second spring part, wherein the outer diameter of the first spring part is less than the outer diameter of the second spring part.

Specifically, the spring 403 is an integral structure, the first spring part is configured as a main body portion 4031, and the second spring part is configured as a bottom 4032 located below the main body portion. The main body portion 4031 is configured as a cylindrical spiral spring, preferably a cylindrical spiral spring with parallel tightened, and the bottom 4032 is configured as a truncated cone spring or a flat spiral spring, or a cylindrical spiral spring.

In this embodiment, the chassis connecting portion 204 is configured to be located on the outer side edge of the chassis 20 and is provided with a first holding cavity 2061 that is integrally formed on the chassis 20. The first holding cavity includes a first holding cavity longitudinal portion 2061a and a first holding cavity transverse portion 2061b. The second mating member 404 is configured to have a second holding cavity 4061, and the second holding cavity includes a second holding cavity longitudinal portion 4061a and a second holding cavity transverse portion 4061b. When the second mating member 404 is assembled with the chassis connecting portion 204, the first holding cavity 2061 and the second holding cavity 4061 together form a completed holding cavity, wherein the first holding cavity longitudinal portion 2061a and the second holding cavity longitudinal portion 4061a together form an holding cavity longitudinal portion, and the first holding cavity transverse portion 2061b and the second holding cavity transverse portion 4061b together form an holding cavity transverse portion. The holding cavity longitudinal portion is configured to accommodate the main body portion 4031 of the spring, and the minimum inner diameter of the holding cavity longitudinal portion is not less than the maximum outer diameter of the main body portion 4031 and is less than the maximum outer diameter of the bottom 4032. Preferably, the inner diameter of the holding cavity longitudinal portion is equal to or slightly greater than the outer diameter of the main body portion 4031. The holding cavity transverse portion is configured to accommodate the bottom 4032 of the spring, and the minimum inner diameter of the holding cavity transverse portion is not less than the maximum outer diameter of the bottom 4032 and is greater than the inner diameter of the holding cavity longitudinal portion. Preferably, the inner diameter of the holding cavity transverse portion is equal to or slightly greater than the outer diameter of the bottom 4032. Preferably, the height of the holding cavity transverse portion is equal to or slightly greater than the maximum height of the bottom 4032, so as to stably fix the bottom 4032 of the spring in the holding cavity transverse portion. In some embodiments, the first holding cavity transverse portion 2061b and/or the second holding cavity transverse portion 4061b is in interference fit with the bottom 4032 of the spring. Preferably, the interference fit is an interference fit that has a small magnitude of interference and does not affect the assembly or the non-destructive disassembly. In this embodiment, the chassis connecting portion 204 and the second mating member 404 are connected by a hook and slot structure. In other embodiments, the chassis connecting portion 204 and the second mating member 404 can also be connected by screws, rivets, hot melt welding, adhesives, or the like.

The steps of assembling the housing 10 and the chassis 20 by using the above-mentioned attachment unit 30 are as follows: S1, mounting the connecting sleeve 301 on the housing 10, and inserting the spring 403 into the first holding cavity 2061 along the radial direction of the spring, so that the first spring part is at least partially accommodated in the first holding cavity longitudinal portion, and the second spring part is at least partially accommodated in the first holding cavity transverse portion, at this time, since the second mating member 404 is not assembled with the chassis connecting part 204 yet, although the first holding cavity transverse portion restricts the spring 403 from moving along the axial direction to a certain extent, the spring can still move along the radial direction to depart from the chassis mounting portion 204; S2, buckling the second mating member 404 to the slot of the chassis along the radial direction of the spring 403; S3, cooperatively screwing the helical portion 4024 of the first mating member with the upper end of the first spring part; and S4, placing the housing 10 above the chassis 20, aligning and pressing the connecting sleeve 301 and the head 4021 of the first mating member downwards, so that the head 4021 enters the holding portion 3012, and then the assembly is completed.

In other embodiments, the above-mentioned step S1 includes mounting the connecting sleeve 301 on the housing 10, and inserting the spring 403 into the second holding cavity 4061 along the radial direction of the spring, so that the first spring part is at least partially received in the second holding cavity longitudinal portion, and the second spring part is at least partially received in the second holding cavity transverse portion. At this time, since the second mating member 404 is not yet assembled with the chassis connecting part 204 yet, although the second holding cavity transverse portion restricts the spring 403 from moving along the axial direction to a certain extent, the spring can still move along the radial direction to depart from the second mating member 404.

Figure 15:
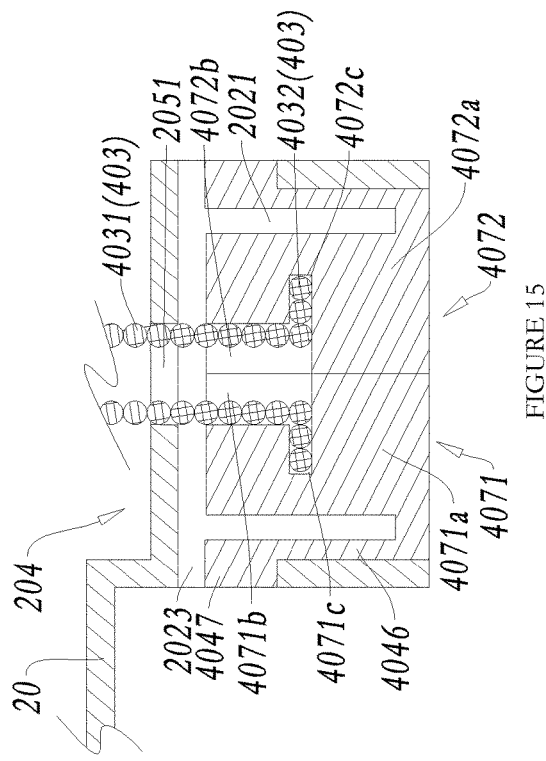
FIG. 15 is a partial sectional view of an autonomous operating apparatus according to another embodiment of the present invention.

FIG. 15 shows a partial structure of the attachment unit of autonomous operating apparatus 16 according to another specific embodiment of the present invention, and specifically shows a third connecting structure. For the sake of brevity, only the differences in the embodiment described in FIG. 10 to FIG. 12, the embodiment described in FIG. 13, or the embodiment described in FIG. 14 are schematically shown here, and the other identical or similar structures are not described in detail Referring to FIG. 15, in this embodiment, the spring 403 is configured to include a first spring part and a second spring part, wherein the outer diameter of the first spring part is less than the outer diameter of the second spring part. Specifically, the spring 403 is an integral structure, the first spring part is configured as a main body portion 4031, and the second spring part is configured as a bottom 4032 located below the main body portion. The main body portion 4031 is configured as a cylindrical spiral spring, preferably a parallel cylindrical spiral spring, and the bottom 4032 is configured as a truncated cone spring or a flat spiral spring, or a cylindrical spiral spring.

In this embodiment, the chassis connecting portion 204 is configured to be located on the outer edge of the chassis 20 and is provided with an holding cavity 2021 that is integrally formed on the chassis 20, and the holding cavity is a concave cavity. The holding cavity 2021 has an open end, and the open end is located at the lower end of the holding cavity 2021. The holding cavity 2021 is further provided with a through hole 2051, and the through hole 2051 is located at the upper end of the holding cavity 2021. The attachment unit 30 includes a connecting sleeve, a first mating member, a spring 403 and a second mating member 404. The structures of the connecting sleeve and the first mating member are the same as those in the embodiment described above, and thus will not be repeated. The second mating member 404 is configured to at least include a first mating component 4071 and a second mating component 4072, when the first mating component 4071 is fixedly connected with the second mating component 4072, the bottom 4032 of the spring is fixed between the first mating component 4071 and the second mating component 4072, that is, the bottom 4032 is clamped by the first mating component 4071 and the second mating component 4072, wherein the fixed connection between the first mating component 4071 and the second mating component 4072 can be realized by the connecting structure between the first mating component 4071 and the second mating component 4072, for example, the first mating component 4071 and the first mating component 4072 can be connected by hook and slot structures, screws, rivets, adhesives, fusion welding, or the like. The fixed connection between the first mating component 4071 and the second mating component 4072 can also be realized by connecting the second mating member 404 integrally with the chassis connecting portion 204, in this case, if the second mating member 404 is not assembled with the chassis connecting parts 204, then a stable connection is not formed between the first mating component 4071 and the second mating component 4072.

The first mating component 4071 is configured to have a first mating component main body 4071a, the first mating component main body 4071a is configured with a first holding cavity, and the first holding cavity includes a first holding cavity longitudinal portion 4071b and a first holding cavity transverse portion 4071c. The second mating component 4072 is configured to have a second mating component main body 4072a, the second mating component main body 4072a is configured with a second holding cavity, and the second holding cavity includes a second holding cavity longitudinal portion 4072b and a second holding cavity transverse portion 4072c. When the first mating component 4071 and the second mating component 4072 are combined together, the first holding cavity and the second holding cavity together form a completed holding cavity, wherein the first holding cavity longitudinal portion 4071b and the second holding cavity longitudinal portion 4072b together form an holding cavity longitudinal portion, and the first holding cavity transverse portion 4071c and the second holding cavity transverse portion 4072c together form an holding cavity transverse portion. The holding cavity longitudinal portion is configured to accommodate the main body portion 4031 of the spring, and the minimum inner diameter of the holding cavity longitudinal portion is not less than the maximum outer diameter of the main body portion 4031 and is less than the maximum outer diameter of the bottom 4032. Preferably, the inner diameter of the holding cavity longitudinal portion is equal to or slightly greater than the outer diameter of the main body portion 4031. The holding cavity transverse portion is configured to accommodate the bottom 4032 of the spring, and the minimum inner diameter of the holding cavity transverse portion is not less than the maximum outer diameter of the bottom 4032 and is greater than the inner diameter of the holding cavity longitudinal portion. Preferably, the inner diameter of the holding cavity transverse portion is equal to or slightly greater than the outer diameter of the bottom 4032. Preferably, the height of the holding cavity transverse portion is equal to or slightly greater than the maximum height of the bottom 4032, so as to stably fix the bottom 4032 of the spring in the holding cavity transverse portion. In some embodiments, the first holding cavity transverse portion 4071c and/or the second holding cavity transverse portion 4072c is in interference fit with the bottom 4032 of the spring. Preferably, the interference fit is an interference fit that has a small magnitude of interference and does not affect the assembly or the non-destructive disassembly. In this embodiment, the assembly direction of the first mating component 4071 and the second mating component 4072 is along the radial direction of the spring 403. For those skilled in the art, under the teaching of the above-mentioned embodiment, it can be easily obtained that the assembly direction of the first mating component 4071 and the second mating component 4072 is a technical solution along the axial direction of the spring 403, which achieves the same technical effect as the above-mentioned embodiment.

When the first mating component 4071 and the second mating component 4072 are combined together to form the complete second mating member 404, the main body of the second mating member 404 is configured to be plate-shaped, and the shape of the main body is configured to mate the shape of the open end of the holding cavity 2021, so as to cover the open end of the holding cavity 2021 after the second mating member 404 is assembled with the chassis mounting portion 204. At least a pair of elastic arms 4046 respectively extends upwards from the lower surface of the main body on opposite sides, and hooks 4047 are arranged at the tail ends of the elastic arms 4046. The hook 4047 and the slot 2023 of the chassis together form a buckle structure to clamp the second mating member 404 on the chassis 20. Preferably, at least one elastic arm 4046 is configured on the first mating component 4071, and at least one elastic arm 4046 is configured on the second mating component 4072. In other embodiments, the second mating member 404 and the chassis 20 can also be connected in other ways, for example, via screws, rivets, gluing, fusion welding, or the like.

The steps of assembling the housing 10 and the chassis 20 by using the above-mentioned attachment unit 30 are as follows: S1, mounting the connecting sleeve 301 on the housing 10, and inserting the spring 403 into the first holding cavity along the radial direction of the spring, so that the first spring part is at least partially accommodated in the first holding cavity longitudinal portion, and the second spring part is at least partially accommodated in the first holding cavity transverse portion; S2, combining the second mating component 4072 with the first mating component 4071 to form the complete second mating member 404; S3, buckling the second mating member 404 upwards to the slot 2023 of the chassis; S4, cooperatively screwing the helical portion 4024 of the first mating member with the upper end of the first spring part; and S5, placing the housing 10 above the chassis 20, aligning and pressing the connecting sleeve 301 and the head 4021 of the first mating member downwards, so that the head 4021 enters the holding portion 3012, and then the assembly is completed. By adopting the technical solution described in this embodiment, it is conducive to simplifying the installation procedures and reducing the production cost.

In various above-mentioned implementation manners and embodiments, the second connecting structure can also be configured as the same structure as the third connecting structure in any one of the embodiments. Based on the detailed description of various third connecting structures in the present invention, it is easy for those skilled in the art to make such modifications, and for the sake of brevity, no detailed description is given here.

In each of the above-mentioned implementations and embodiments, the first connecting structure may also be configured as a non-detachable connection and the fourth connecting structure may also be configured as a non-detachable connection. The non-detachable connection described here refers in particular to the fact that detachment cannot be achieved without damaging the existing structure, typically for example by means of a hot melt welding connection, an adhesive connection, etc. Even more, in some embodiments, the first connecting structure and/or the fourth connecting structure are configured as a one-piece connection structure. With this technical solution, the number of parts can be further reduced, which helps to simplify the assembly process, reduce production costs and increase the reliability of the product.

It should be understood that although this specification is described in terms of embodiments, not each embodiment comprises only one separate technical solution, the specification is described in this way only for clarity, and the person skilled in the art should consider the specification as a whole, and the technical solutions in each embodiment can be suitably combined to form other embodiments that can be understood by the person skilled in the art.

The series of detailed descriptions given above are only specific to the feasible embodiments of the present invention, they are not intended to limit the scope of protection of the present invention, and any equivalent embodiments or variations not departing from the spirit of the art of the present invention shall be included within the scope of protection of the present invention.

The invention claimed is:

1. An autonomous operating apparatus, comprising:
a main body mechanism, the main body mechanism comprising a first main body portion and a second main body portion, the first main body portion being configured to be connected to the second main body portion via an attachment unit,
wherein the attachment unit comprises a first mating member, an elastic member and a second mating member;
wherein the first mating member is integrally formed with the first main body portion or can be connected to the first main body portion via a first connecting structure;
wherein the elastic member is configured such that the first end of the elastic member connects to the first mating member via a second connecting structure, and the second end of the elastic member connects to the second mating member via a third connecting structure;
wherein the second mating member is integrally formed with the second main body portion or is connected to the second main body portion via a fourth connecting structure;
wherein the third connecting structure is configured such that the second end of the elastic member is clamped and fixed between said second main body portion and said second mating member; and
wherein the elastic member comprises a first part of the elastic member and a second part of the elastic member, and the outer diameter of the first part of the elastic member is smaller than the outer diameter of the second part of the elastic member; and when the third connecting structure is in a connected state, the second part of the elastic member is fixed between the second main body portion and the second mating member.

2. The autonomous operating apparatus according to claim 1, wherein the first main body portion is configured as a housing, and the second main body portion is configured as a chassis; or the first main body portion is configured as a chassis, and the second main body portion is configured as a housing;
wherein the housing moves relative to the chassis in a restoring manner when receiving an external force, the elastic member being configured as a spiral spring; and
wherein the spiral spring has a constant outer diameter and/or inner diameter, or the spiral spring has a variant outer diameter and/or inner diameter.

3. The autonomous operating apparatus according to claim 1, wherein the first part of the elastic member is configured as a cylindrical spiral spring; and
wherein the second part of elastic member is configured as a truncated cone spring, a flat spiral spring, a cylindrical spiral spring or a lug structure.

4. The autonomous operating apparatus according to claim 1, wherein, when the second mating member is connected with the second main body portion, at least a part of the second part of the elastic member is fixed between the second main body portion and the second mating member.

5. The autonomous operating apparatus according to claim 1, wherein, when the second mating member is separated from the second main body portion, a restriction on the axial movement of the elastic member is released; and/or
wherein, when the second mating member is separated from the second main body portion, a restriction on the radial movement of the elastic member is released.

6. The autonomous operating apparatus according to claim 1, wherein the second connecting structure is configured such that, when the first mating member is connected with the first main body portion, the first end of the elastic member is fixed between the first main body portion and the first mating member.

7. The autonomous operating apparatus according to claim 6, wherein the elastic member comprises a first part of the elastic member and second parts of the elastic member, and the outer diameter of the first part of the elastic member is smaller than the outer diameter of the second parts of the elastic element;
wherein the second parts of the elastic member are arranged at the both ends of the first part of the elastic element; and
wherein, when the second connecting structure is in the connected state, the two second parts of the elastic member are respectively fixed between the first main body portion and the first mating member, and between the second main body portion and the second mating member.

8. The autonomous operating apparatus according to claim 6, wherein, when the first mating member is separated from the first main body portion, a restriction on the axial movement of the elastic member is released; and/or
wherein, when the first mating member is separated from the first main body portion, a restriction on the radial movement of the elastic member is released.

9. The autonomous operating apparatus according to claim 1, wherein the second connecting structure comprises a first spiral groove configured on the first mating member, and a second spiral groove configured at the first end of the elastic member, and the first spiral groove is adapted to the second spiral groove, the first mating member sequentially comprises a head, a rod portion and a spiral portion from top to bottom, wherein the head is movably connected to the first main body portion, the rod portion is rod-shaped, the spiral portion is provided with the first spiral groove, and the first end of the elastic member is matched with the first spiral groove, so that the elastic member is connected to the first mating member.

10. The autonomous operating apparatus according to claim 1, wherein the first connecting structure comprises a connecting sleeve connected to the first main body portion, and a head configured on the first mating member;

wherein the connecting sleeve is detachably connected to the first main body portion; and wherein the head is configured to be spherical, and the first mating member is movably connected to the connecting sleeve via the head.

11. The autonomous operating apparatus according to claim 1, wherein the first connecting structure and/or the fourth connecting structure is configured as a hook and slot structure, a screw fixing structure or a rivet fixing structure.

12. The autonomous operating apparatus according to claim 1, wherein the first connecting structure comprises a spiral portion configured on one of the first mating member and the first main body portion, and a slot configured on the other of the first mating member and the first main body portion, the spiral portion comprises a hook, and the hook is adapted to the slot.

13. The autonomous operating apparatus according to claim 1, wherein the fourth connecting structure comprises a spiral portion configured on one of the second mating member and the second main body portion, and a slot configured on the other of the second mating member and the second main body portion, the spiral portion comprises a hook, and the hook is adapted to the slot.

14. The autonomous operating apparatus according to claim 12, wherein the second mating member is provided with a main body, the main body has a plate-shaped structure, at least a pair of spiral portions extends from the main body, the tail end of the spiral portion is provided with a hook, and the second main body portion is provided with a slot, wherein the hook is configured to snap fit with the slot, a through hole is formed in the middle of the main body, the first end of the elastic member passes through the through hole and is connected to the first mating member, and the second end of the elastic member is connected to the second mating member.

* * * * *